United States Patent
Rudy et al.

(10) Patent No.: US 9,441,938 B1
(45) Date of Patent: Sep. 13, 2016

(54) TEST STRUCTURES FOR MEASURING NEAR FIELD TRANSDUCER DISC LENGTH

(71) Applicant: Western Digital (Fremont), LLC, Fremont, CA (US)

(72) Inventors: Steven C. Rudy, San Jose, CA (US); Nurul Amin, Fremont, CA (US); Luc Ving Chung, Fremont, CA (US); Neil D. Knutson, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 260 days.

(21) Appl. No.: 14/096,381

(22) Filed: Dec. 4, 2013

Related U.S. Application Data (60) Provisional application No. 61/888,467, filed on Oct. 8, 2013.

(51) Int. Cl.
| | |
|---|---|
| *G11B 11/00* | (2006.01) |
| *G01B 7/02* | (2006.01) |
| *G11B 5/31* | (2006.01) |
| *G11B 5/00* | (2006.01) |
| *G11B 5/60* | (2006.01) |

(52) U.S. Cl.
CPC .............. *G01B 7/02* (2013.01); *G11B 5/3189* (2013.01); *G11B 5/314* (2013.01); *G11B 5/6088* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 4,670,732 A | 6/1987 | Church | |
| 4,675,986 A | 6/1987 | Yen | |
| 5,065,483 A | 11/1991 | Zammit | |
| 5,199,090 A | 3/1993 | Bell | |
| 5,210,667 A | 5/1993 | Zammit | |
| 5,463,805 A | 11/1995 | Mowry et al. | |
| 5,559,429 A | 9/1996 | Mowry et al. | |
| 5,597,340 A | 1/1997 | Church et al. | |
| 5,722,155 A | 3/1998 | Stover et al. | |
| 5,755,612 A | 5/1998 | Schaenzer et al. | |
| 5,816,890 A | 10/1998 | Hao et al. | |
| 5,876,264 A | 3/1999 | Church et al. | |
| 6,016,290 A | 1/2000 | Chen et al. | |
| 6,018,441 A | 1/2000 | Wu et al. | |
| 6,025,978 A | 2/2000 | Hoshi et al. | |
| 6,025,988 A | 2/2000 | Yan | |
| 6,027,397 A | 2/2000 | Church et al. | |
| 6,032,353 A | 2/2000 | Hiner et al. | |
| 6,033,532 A | 3/2000 | Minami | |
| 6,034,849 A | 3/2000 | Takizawa | |

(Continued)

OTHER PUBLICATIONS

U.S. Appl. No. 13/478,058, filed May 22, 2012, 17 pages.

(Continued)

*Primary Examiner* — Tan X Dinh (57) ABSTRACT

Systems and methods for using NFT disc test structures for controlling NFT disc length during manufacture of an HAMR writer are disclosed. An NFT is manufactured concurrently with one or more pairs of pin-disc and disc-less test structures. The NFT disc and pin dimensions may be substantially similar to the pin and disc dimensions of the pin-disc test structure. The disc length of the pin-disc test structure is measured as a function of the difference in resistance between the two test structures and other parameters. Capturing the disc length variation subsequently enables adjustment of the NFT electronic lapping guide stripe height to reduce length variation in the NFT pin.

13 Claims, 8 Drawing Sheets

(56) References Cited

U.S. PATENT DOCUMENTS

| | | |
|---|---|---|
| 6,034,851 A | 3/2000 | Zarouri et al. |
| 6,043,959 A | 3/2000 | Crue et al. |
| 6,046,885 A | 4/2000 | Aimonetti et al. |
| 6,047,224 A | 4/2000 | Stover et al. |
| 6,049,650 A | 4/2000 | Jerman et al. |
| 6,055,138 A | 4/2000 | Shi |
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,256,170 B1 | 7/2001 | Honda |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,330,488 B1 | 12/2001 | Yoshida et al. |
| 6,333,830 B2 | 12/2001 | Rose et al. |
| 6,340,533 B1 | 1/2002 | Ueno et al. |
| 6,347,983 B1 | 2/2002 | Hao et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,399,401 B1 | 6/2002 | Kye et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,646 B2 | 3/2003 | Watanuki |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |

(56) References Cited

U.S. PATENT DOCUMENTS

| | | |
|---|---|---|
| 6,597,548 B1 | 7/2003 | Yamanaka et al. |
| 6,609,948 B1 | 8/2003 | Fontana, Jr. et al. |
| 6,611,398 B1 | 8/2003 | Rumpler et al. |
| 6,618,223 B1 | 9/2003 | Chen et al. |
| 6,623,330 B2 | 9/2003 | Fukuroi |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,684,171 B2 | 1/2004 | Church et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,699,102 B2 | 3/2004 | Reiley et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,728,067 B2 | 4/2004 | Crawforth et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Chen et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,758,722 B2 | 7/2004 | Zhu |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,795,630 B2 | 9/2004 | Challener et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,834,027 B1 | 12/2004 | Sakaguchi et al. |
| 6,857,937 B2 | 2/2005 | Bajorek |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,884,148 B1 | 4/2005 | Dovek et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,950,289 B2 | 9/2005 | Lam et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,982,042 B2 | 1/2006 | Church et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,014,530 B2 | 3/2006 | Kasiraj et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,034,277 B2 | 4/2006 | Oumi et al. |
| 7,035,046 B1 | 4/2006 | Young et al. |
| 7,041,985 B1 * | 5/2006 | Wang ............... G01N 1/32 250/442.11 |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,139,152 B2 | 11/2006 | Mahnad et al. |
| 7,149,061 B2 | 12/2006 | Yamakura et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,186,348 B2 | 3/2007 | Chen et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,206,172 B2 | 4/2007 | Ding et al. |
| 7,211,339 B1 | 5/2007 | Seagle et al. |
| 7,212,384 B1 | 5/2007 | Stoev et al. |
| 7,215,629 B2 | 5/2007 | Eppler |
| 7,238,292 B1 | 7/2007 | He et al. |
| 7,239,478 B1 | 7/2007 | Sin et al. |
| 7,244,169 B2 | 7/2007 | Cyrille et al. |
| 7,245,459 B2 | 7/2007 | Cyrille et al. |
| 7,248,431 B1 | 7/2007 | Liu et al. |

(56) References Cited

U.S. PATENT DOCUMENTS

| | | |
|---|---|---|
| 7,248,433 B1 | 7/2007 | Stoev et al. |
| 7,248,449 B1 | 7/2007 | Seagle |
| 7,268,976 B2 | 9/2007 | Yamakura et al. |
| 7,271,982 B2 | 9/2007 | MacDonald et al. |
| 7,272,079 B2 | 9/2007 | Challener |
| 7,272,883 B2 | 9/2007 | Le et al. |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,287,316 B2 | 10/2007 | Kasahara et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,330,404 B2 | 2/2008 | Peng et al. |
| 7,333,295 B1 | 2/2008 | Medina et al. |
| 7,333,300 B2 | 2/2008 | Church et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,359,152 B2 | 4/2008 | Matono et al. |
| 7,360,296 B2 | 4/2008 | Cyrille et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,393,262 B2 | 7/2008 | Biskeborn |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,480,214 B2 | 1/2009 | Challener et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,639,457 B1 | 12/2009 | Chen et al. |
| 7,642,205 B2 | 1/2010 | Timans |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,710,686 B2 | 5/2010 | Kim et al. |
| 7,719,795 B2 | 5/2010 | Hu et al. |
| 7,724,470 B2 | 5/2010 | Poon et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,821,732 B2 | 10/2010 | Komura et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,861,400 B2 | 1/2011 | Lille |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,936,531 B2 | 5/2011 | Tomikawa et al. |
| 7,948,714 B2 | 5/2011 | Yin et al. |
| 7,968,219 B1 | 6/2011 | Jiang et al. |
| 7,982,989 B1 | 7/2011 | Shi et al. |
| 7,996,986 B2 | 8/2011 | Gokemeijer |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,085,459 B1 | 12/2011 | Russell et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,111,443 B1 | 2/2012 | Russell et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 * | 4/2012 | Rudy ............... G11B 5/3166 29/603.09 |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,628 B2 | 5/2012 | Zhou et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,891 B2 | 8/2012 | Lee et al. |
| 8,248,896 B1 * | 8/2012 | Yuan ............... G11B 5/3116 369/112.27 |

(56) References Cited

U.S. PATENT DOCUMENTS

| | | |
|---|---|---|
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,302,480 B2 | 11/2012 | Maris et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,566 B2 | 12/2012 | Shimazawa et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,339,905 B2 | 12/2012 | Rausch et al. |
| 8,341,826 B1 | 1/2013 | Jiang et al. |
| 8,343,319 B1 | 1/2013 | Li et al. |
| 8,343,364 B1 * | 1/2013 | Gao ............... G11B 5/314 204/192.34 |
| 8,349,195 B1 | 1/2013 | Si et al. |
| 8,351,307 B1 * | 1/2013 | Wolf ............... G11B 5/314 369/112.27 |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,411,393 B2 | 4/2013 | Zou et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |

(56) References Cited

U.S. PATENT DOCUMENTS

| | | | |
|---|---|---|---|
| 8,705,205 B1 | 4/2014 | Li et al. | |
| 8,721,902 B1 * | 5/2014 | Wang | G11B 5/314 216/22 |
| 8,749,790 B1 * | 6/2014 | Tanner | G01N 21/553 356/445 |
| 8,758,083 B1 * | 6/2014 | Rudy | G11B 5/314 29/603.01 |
| 8,964,333 B1 | 2/2015 | Hu et al. | |
| 2002/0044285 A1 | 4/2002 | Pedersen et al. | |
| 2003/0020467 A1 | 1/2003 | Kasahara et al. | |
| 2003/0112542 A1 | 6/2003 | Rettner et al. | |
| 2003/0128634 A1 | 7/2003 | Challener | |
| 2003/0137772 A1 | 7/2003 | Challener | |
| 2003/0184903 A1 | 10/2003 | Challener | |
| 2004/0001394 A1 | 1/2004 | Challener et al. | |
| 2004/0110365 A1 | 6/2004 | Su et al. | |
| 2004/0179310 A1 | 9/2004 | Lam et al. | |
| 2005/0023673 A1 | 2/2005 | Nowak | |
| 2005/0052771 A1 | 3/2005 | Rausch et al. | |
| 2005/0067372 A1 | 3/2005 | Li et al. | |
| 2005/0067374 A1 | 3/2005 | Baer et al. | |
| 2005/0078565 A1 | 4/2005 | Peng et al. | |
| 2005/0122850 A1 | 6/2005 | Challener et al. | |
| 2006/0000795 A1 | 1/2006 | Chen et al. | |
| 2006/0028770 A1 | 2/2006 | Etoh et al. | |
| 2006/0044683 A1 | 3/2006 | Matono et al. | |
| 2006/0103990 A1 | 5/2006 | Ito et al. | |
| 2006/0126222 A1 | 6/2006 | Aoki et al. | |
| 2006/0233061 A1 | 10/2006 | Rausch et al. | |
| 2007/0008660 A1 | 1/2007 | Yamakura et al. | |
| 2007/0116420 A1 | 5/2007 | Estes et al. | |
| 2007/0139816 A1 | 6/2007 | Chen et al. | |
| 2007/0159720 A1 | 7/2007 | Sohn et al. | |
| 2007/0165495 A1 | 7/2007 | Lee et al. | |
| 2007/0177300 A1 | 8/2007 | Yin et al. | |
| 2008/0005543 A1 | 1/2008 | Rychlik | |
| 2008/0068748 A1 | 3/2008 | Olson et al. | |
| 2008/0072418 A1 | 3/2008 | Kondo et al. | |
| 2008/0144215 A1 | 6/2008 | Hsiao et al. | |
| 2008/0158730 A1 | 7/2008 | Furukawa et al. | |
| 2008/0181560 A1 | 7/2008 | Suh et al. | |
| 2008/0204916 A1 | 8/2008 | Matsumoto et al. | |
| 2008/0232225 A1 | 9/2008 | Cho et al. | |
| 2009/0165285 A1 | 7/2009 | Takayama et al. | |
| 2009/0185459 A1 | 7/2009 | Matsumoto | |
| 2010/0118664 A1 | 5/2010 | Nishida et al. | |
| 2010/0123900 A1 | 5/2010 | Chau et al. | |
| 2010/0142079 A1 | 6/2010 | Tanaka et al. | |
| 2010/0157745 A1 | 6/2010 | Okada et al. | |
| 2010/0208391 A1 | 8/2010 | Gokemeijer | |
| 2010/0214685 A1 | 8/2010 | Seigler et al. | |
| 2010/0290157 A1 | 11/2010 | Zhang et al. | |
| 2010/0315735 A1 | 12/2010 | Zhou et al. | |
| 2010/0316327 A1 | 12/2010 | Montoya et al. | |
| 2010/0321814 A1 | 12/2010 | Zou et al. | |
| 2011/0086240 A1 | 4/2011 | Xiang et al. | |
| 2011/0122737 A1 | 5/2011 | Shimazawa et al. | |
| 2011/0179634 A1 | 7/2011 | Yin et al. | |
| 2011/0216635 A1 | 9/2011 | Matsumoto | |
| 2011/0235480 A1 | 9/2011 | Goulakov et al. | |
| 2011/0292774 A1 | 12/2011 | Osawa et al. | |
| 2011/0294398 A1 * | 12/2011 | Hu | B24B 37/013 451/5 |
| 2012/0092971 A1 | 4/2012 | Schreck et al. | |
| 2012/0111826 A1 | 5/2012 | Chen et al. | |
| 2012/0155232 A1 | 6/2012 | Schreck et al. | |
| 2012/0163137 A1 | 6/2012 | Wang et al. | |
| 2012/0216378 A1 | 8/2012 | Emley et al. | |
| 2012/0230138 A1 | 9/2012 | Endo | |
| 2012/0237878 A1 | 9/2012 | Zeng et al. | |
| 2012/0298621 A1 | 11/2012 | Gao | |
| 2013/0216702 A1 | 8/2013 | Kaiser et al. | |
| 2013/0216863 A1 | 8/2013 | Li et al. | |
| 2013/0257421 A1 | 10/2013 | Shang et al. | |

OTHER PUBLICATIONS

U.S. Appl. No. 13/332,194, filed Dec. 20, 2011, 29 pages.
U.S. Appl. No. 13/314,962, filed Dec. 8, 2011, 23 pages.
Bill Challener, "Plasmonic transducer for near field heat assisted magnetic recording", 2009 CMOS Emerging Technologies Workshop, Sep. 24, 2009, 19 pages.
Ikkawi, R., et al., "Near-Field Optical Transducer for Heat-Assisted Magnetic Recording for Beyond-10-Tbit/in2 Densities", Journal of Nanoelectronics and Optoelectronics, vol. 3, 44-54, 2008.
Chubing Peng, "Surface-plasmon resonance of a planar lollipop near-field transducer", Applied Physics Letters 94, 171106-1, Apr. 2009, 4 pages.

* cited by examiner

TEST STRUCTURES FOR MEASURING NEAR FIELD TRANSDUCER DISC LENGTH

CROSS-REFERENCE TO RELATED APPLICATION

This application claims the benefit of U.S. Provisional Application Ser. No. 61/888,467, filed Oct. 8, 2013, which is incorporated herein by reference in its entirety.

BACKGROUND

Heat-assisted magnetic recording (HAMR) writers have been developed to meet the growing demand for improved magnetic disk drive data capacity. HAMR writers heat high-stability magnetic compounds to apply changes in magnetic orientation. These materials can store bits in a much smaller areas without being limited by the superparamagnetic effect. The manufacture of HAMR writers may be improved by carefully controlling the lapped pin length, the distance from the air-bearing surface (ABS) to the intersection of the Near-Field Transducer (NFT) pin and NFT disc (or disk).

BRIEF DESCRIPTION OF THE DRAWINGS

The present application is illustrated by way of example, and not limitation, in the figures of the accompanying drawings in which.

DETAILED DESCRIPTION

In the following description, numerous specific details are set forth to provide a thorough understanding of various embodiment of the present disclosure. It will be apparent to one skilled in the art, however, that these specific details need not be employed to practice various embodiments of the present disclosure. In other instances, well known components or methods have not been described in detail to avoid unnecessarily obscuring various embodiments of the present disclosure.

In accordance with the present disclosure, systems and methods for using NFT disc test structures for controlling NFT disc length during manufacture of an HAMR writer are disclosed.

Figure 1A:
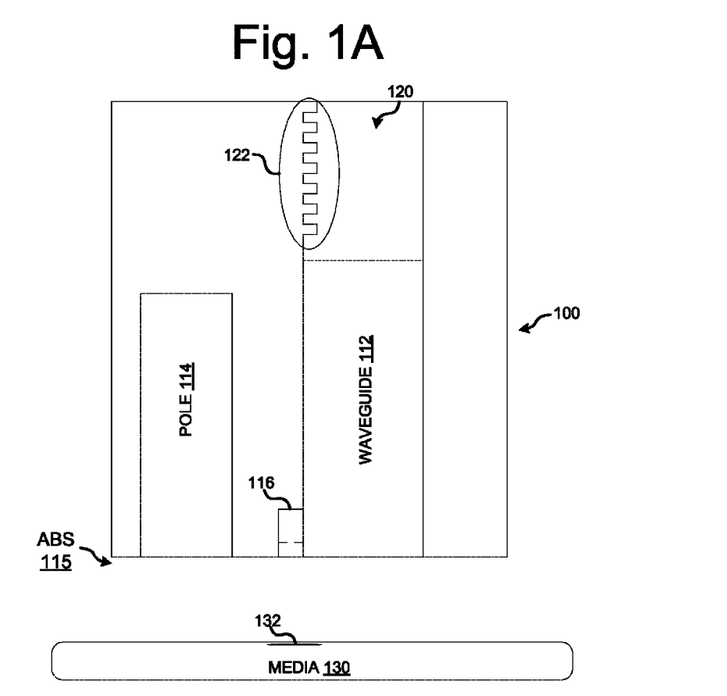
FIGS. 1A-1B illustrate an exemplary HAMR writer that may be manufactured in accordance with embodiments of the present disclosure.
Figure 1B:
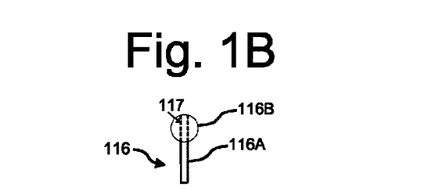

FIGS. 1A-1B illustrate an exemplary HAMR writer 100 that may be manufactured in accordance with embodiments of the present disclosure. FIG. 1A is a cross-sectional view of HAMR writer 100. HAMR writer 100 may comprise a waveguide 112, a pole 114, a near-field transducer (NFT) 116, a grating 120, and a light (e.g. laser) spot 122 on the grating 120. FIG. 1B is a top view of NFT 116. NFT 116 includes a disc portion 116B and a pin portion 116A. Disc portion 116B may be shaped as a circle, a square, or another shape. The light or light energy from light spot 122 on grating 120 is coupled to waveguide 112, which guides the light energy to NFT 116 near air-bearing surface (ABS) 115. Disc portion 116B of NFT 116 collects light energy from waveguide 112 and radiates it through pin 116A to media 130 on spot 132 to elevate the temperature of media 130 and reduce coercivity and change the magnetization of the media. HAMR 100 may then write data to the heated region of recording media 130 by energizing pole 114.

During manufacture of HAMR 100, it is desirable to control dimensions of NFT 116, particularly the length of pin portion 116A. The length of pin portion 116A may be controlled by controlling the length 117 of disc portion 116B during manufacture of HAMR 100. Capturing the disc length variation can enable adjustment of NFT 116 electronic lapping guide (ELG) stripe height to reduce the length variation of pin portion 116A. As further described below, NFT disc test structures manufactured on the same wafer as NFT 116 may be used for controlling NFT 116 disc length. In the test structures, disc length variation may be captured by measuring disc length from the difference as a function of the resistance of two or more test structures.

Figure 2:
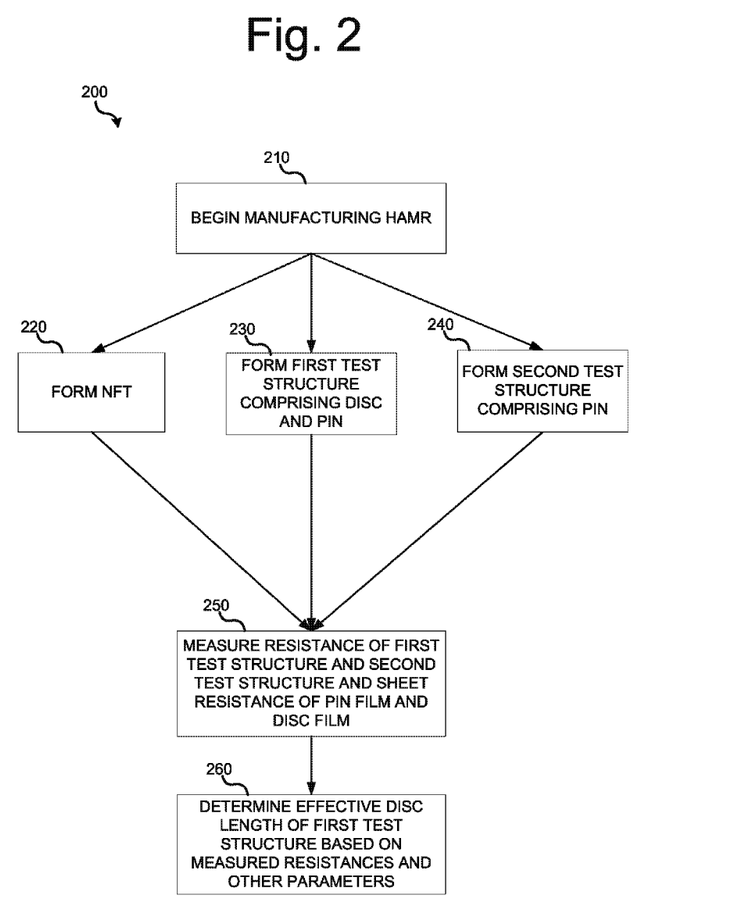
FIG. 2 is an operational flow diagram illustrating an exemplary process for measuring the disc length of an NFT during manufacture of an HAMR writer.

FIG. 2 is an operational flow diagram illustrating an exemplary process 200 for measuring the disc length of an NFT 116 during manufacture of an HAMR writer 100. For simplicity, some process operations may be omitted. At operation 210, manufacture of an HAMR 100 begins on a wafer. During a subsequent process operation 220, the HAMR NFT 116 is formed. As illustrated in exemplary process, 200, a first test structure comprising a disc and pin and a second disc-less test structure comprising a pin may be concurrently manufactured with NFT 116 on the same wafer at process operations 230 and 240. In this embodiment, the first and test structure are manufactured on the same wafer as NFT 116, for example, isolated on a separate bar at the top of the flash field of the wafer. In other embodiments, the first and second test structure may be manufactured on other parts of the wafer. In one embodiment, the first and second test structure are formed at the same time that the disc and pin of NFT 116 are defined, for example, using the same mask or masks. In some embodiments a plurality of first and second test structure pairs with different dimensions are manufactured concurrently with the manufacture of NFT 116.

Concurrent manufacture of the first and second test structures on the same wafer as NFT 116 provides the benefit of insuring that process variations in the manufacture of HAMR writer 100 and NFT 116 do not influence any data (further described below) obtained from the test structures. For example, concurrent manufacture on the same wafer helps insure that the first test structure disc length is approximately the same as NFT 116 disc length. In this embodiment, a multiple pattern masking structure with a single image of the disc and pin may be used during manufacture of the first and second test structures. In alternative embodiments, the first and second test structures are not manufactured concurrently with NFT 116.

Figure 3:
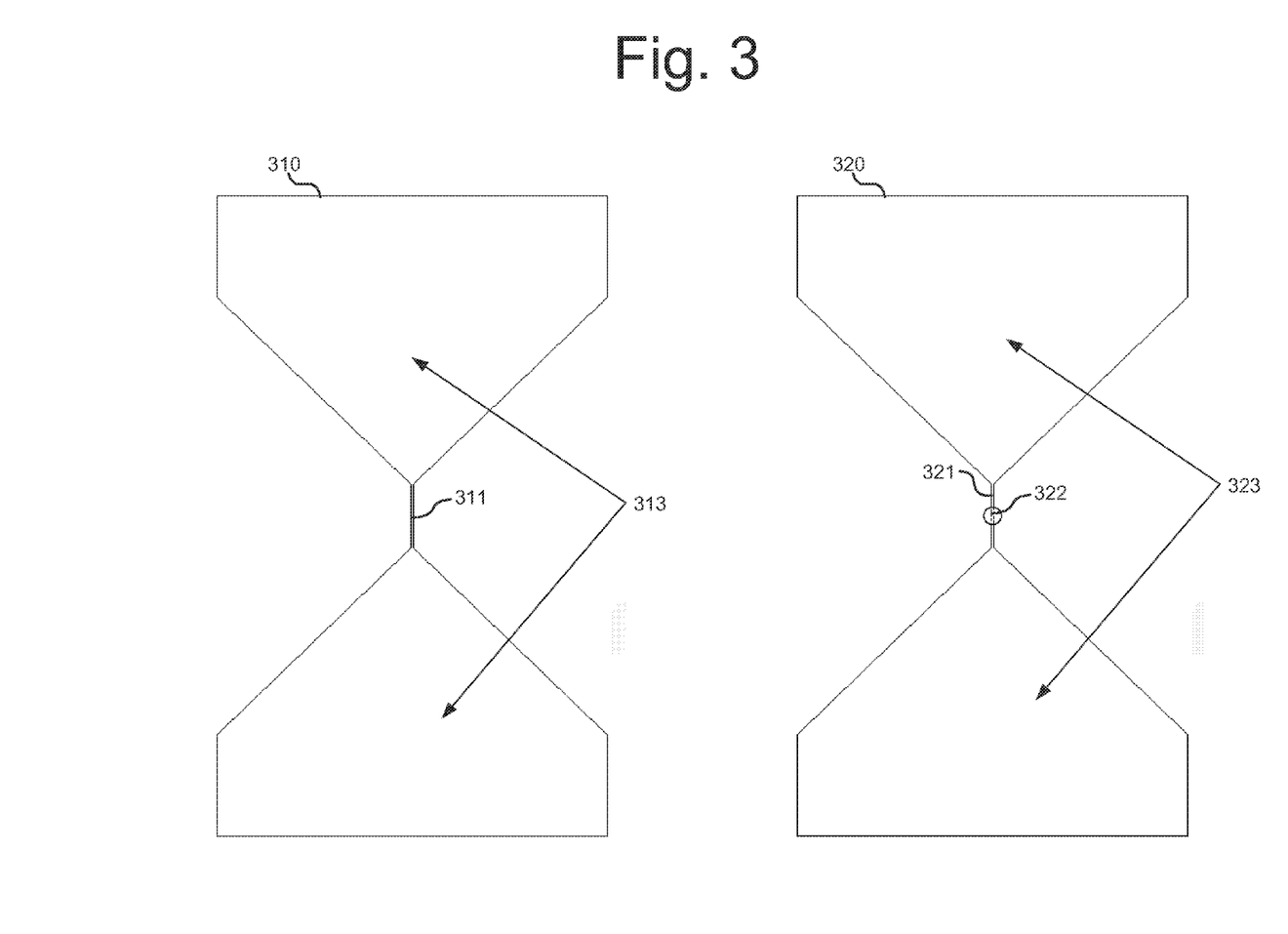
FIG. 3 illustrates an example pair of resistor test structures that may be used to measure the disc length of an NFT.

FIG. 3 illustrates an example pair of resistor test structures 310 and 320 that may be manufactured concurrently with NFT 116 at operations 220-250 and used to measure the disc length of NFT 116. Test structure 310 is a disc-less structure comprising a pin 311 and test structure 320 comprises a pin 321 and disc 322. As illustrated in FIG. 3, disc 322 has a different arrangement than on NFT 116, i.e. it is recessed above the ABS. In one embodiment test structure 310 and test structure 320 are defined on the same film (e.g. a gold film) as the NFT 116 disc and pin. In this embodiment, disc 322 and pin 321 (or pin 311) may have approximately the same dimensions as the disc and pin of NFT 116. As illustrated in FIG. 3, test structure 310 and test structure 320 may be defined with approximately the same dimensions (e.g. shape, pin length, etc.). In alternative embodiments, test structure 310 and test structure 320 are defined with different dimensions. Disc 322 and pin 321 of test structure 320 may be defined on different films (e.g. a disc film and a pin film) or the same film (e.g. a pin film).

At operation 250, the resistances of each of the two disc test structures (e.g. test structures 310 and 320) are measured. The sheet resistance of the disc film and pin film are also measured at operation 250 by building a neighboring test structure such as, for example, a van der Pauw test pattern. In embodiments where the disc and pin are on the same film, one sheet resistance is measured. The measured resistances may be used with other parameters to calculate or measure the disc length of the disc-pin test structure. Because the disc-pin structure preferably has approximately the same disc and pin dimensions as NFT 116, the disc length of NFT 116 is measured or estimated in this way. As illustrated in FIG. 3, resistance $R_o$ may be measured for test structure 310 and resistance $R_d$ may be measure for test structure 320 by placing a pair of leads on a pair of contacts 313 and 323, respectively, at the top and bottom of the structures. In some embodiments, the use of contacts 313 and 323 and leads introduces a leads and contact resistance term into the measurements. The precise placement of contacts 313 and 323 may vary in different embodiments of the disclosure.

With the measured resistances of the first and second test structure, at operation 260 the effective disc length of the disc-pin test structure may be determined based on the measured resistances and other parameters. The measured resistance of a test structure that includes one or more pins, one or more discs, and one or more lead structures may be defined as a function that comprises one or more of the following parameters: pin length ($L_p$), pin width (W), disc diameter (D), disc length ($L_d$), sheet resistance of pin film ($R_s$), sheet resistance of disc film, resistance of the disc structure, and total leads resistance. Using this relation, the measured resistances, and other considerations, discussed below, the disc length ($L_d$) may be defined as a function of known or measured parameters.

In embodiments where the disc-less test structure and pin-disc test structure are approximately identical (e.g. having approximately the same pin length and pin width) and approximately adjacent, the leads resistance term may be eliminated from consideration when defining $L_d$ as a function of the difference in resistance between two adjacent test structures. This comparison carries the benefit of eliminating effects of variation in the pin width in the regions nearest each end of the pin.

In the embodiment where the disc and pin of the pin-disc test structure are formed in a common film, the disc length ($L_d$) may be described as a function of pin width (W) and disc diameter (D) described by Equation (1):

$$L_d = (D^2 - W^2)^{0.5} \quad (1)$$

In another embodiment, the pin may be defined in a separate resistive film from the disc. In particular implementations of this embodiment where the sheet resistance of the pin film is substantially greater than the sheet resistance of the disc film, the test structure may have a greater sensitivity to variation in D and the estimated $L_d$ may be greater than in the embodiment where the pin and disc are defined on the same film.

In the embodiment where the disc and pin are formed in a common film, the number of unknowns is reduced by one (i.e. only need to measure the single film sheet resistance). The pin length ($L_p$) of a test structure may be estimated based on the high aspect ratio (e.g. 20:1 or greater) of current masks used to define the pin. The pin width (W) may then be estimated for a structure from a 4-point measurement of the resistance of the pin structure with no disc ($R_o$), the estimated pin length ($L_p$) and the measured sheet resistance of the pin film (Rs).

Using the above described considerations the disc length ($L_d$) may be described as a function of measured or estimated unknowns. An exemplary implementation of this function is illustrated by Equation (2):

$$L_d = ((R_o - R_d) - kR_s)/(R_s/W) \quad (2)$$

Where:
$R_o$=measured resistance of the disc-less pin structure
$R_d$=measured resistance of the pin-disc structure
k=number of squares in nominal disc
W=pin width
$R_s$=pin film sheet resistance
The parameter k may be determined using finite element modeling (FEM) techniques.

Table 1, below, illustrates finite element modeling (FEM) estimates for particular implementations of both the disc over pin embodiment and the integrated disc and pin embodiment for the resistor test structures 310 and 320 of FIG. 3. In both embodiments, the resistance contribution of the disc is ignored. In the disc over pin embodiment, the pin film comprises Chromium (Cr) and the disc film comprises Gold (Au). In the integrated disc-pin embodiment, the single film comprises Gold (Au). FEM estimates are compared against the calculated disc length from Equation (2).

TABLE 1

| Lead Material | Cr | Cr | Cr | Cr | Au | Au | Au | Au |
|---|---|---|---|---|---|---|---|---|
| Lead Thickness (nm) | 20 | 20 | 20 | 20 | 200 | 200 | 200 | 200 |
| Pin Material | | Au | Au | Au | | Au | Au | Au |
| Pin Type | | Overlap | Overlap | Overlap | | Integrated | Integrated | Integrated |
| Disc Diameter/Length (nm) | | 180 | 200 | 220 | | 180 | 200 | 220 |
| Pin Width | 0.02 | | | | 0.02 | | | |
| Pin Thickness (nm) | | 200 | 200 | 200 | | 200 | 200 | 200 |
| Resistance (Ohms) | 716.181 | 599.146 | 584.328 | 569.085 | 14.319 | 12.328 | 12.048 | 11.765 |
| Pin Rs | 15 | | | | 0.3 | | | |

TABLE 1-continued

| Lead Material | Cr | Cr | Cr | Cr | Au | Au | Au | Au |
|---|---|---|---|---|---|---|---|---|
| Delta Squares | | 7.80233 | 8.79018 | 9.80640 | | 6.63414 | 7.56860 | 8.51162 |
| Estimated Ld (from Delta Squares) | | 0.15605 | 0.17580 | 0.19613 | | 0.13268 | 0.15137 | 0.17023 |
| Calculated Ld (from modeled disc dia. & pin width) | | 0.17889 | 0.19900 | 0.21909 | | 0.17889 | 0.19900 | 0.21909 |

Notes:
Bias was applied on a 20 nm width strip each side

In an alternate embodiment, the resistance contribution of the disc is included. In this embodiment, the disc resistance may be estimated from the adjacent film sheet resistance measurement. Table 2, below, illustrates FEM estimates for particular implementations of the integrated disc and pin embodiment for the resistor test structures 310 and 320 when the estimated disc resistance is factored into the calculation of the change in pin resistance/length. In the illustrated embodiment, the disc "squares" constant may be derived using FEM. FEM estimates are compared against the calculated disc length from Equation (2).

TABLE 2

| Lead Material | Au | Au | Au | Au |
|---|---|---|---|---|
| Lead Thickness (nm) | 200 | 200 | 200 | 200 |
| Pin Material | | Au | Au | Au |
| Pin Type | | integrated | integrated | integrated |
| Disc Diameter/Length (nm) | | 180 | 200 | 220 |
| Pin Width | 0.02 | | | |
| Pin Thickness (nm) | | 200 | 200 | 200 |
| Resistance (Ohms) | 14.319 | 12.328 | 12.048 | 11.765 |
| Disc "squares" @ 200 nm | | 2.347 | 2.347 | 2.347 |
| Adjusted Resistance | | 11.624 | 11.344 | 11.061 |
| Pin Rs | 0.3 | | | |
| Delta Squares | | 8.98084 | 9.91530 | 10.85832 |
| Estimated Ld (from Delta Squares) | | 0.17962 | 0.19831 | 0.21717 |
| Calculated Ld (from modeled disc dia. & pin width) | | 0.17889 | 0.19900 | 0.21909 |

Notes:
Bias was applied on a 20 nm width strip each side

Figure 4:
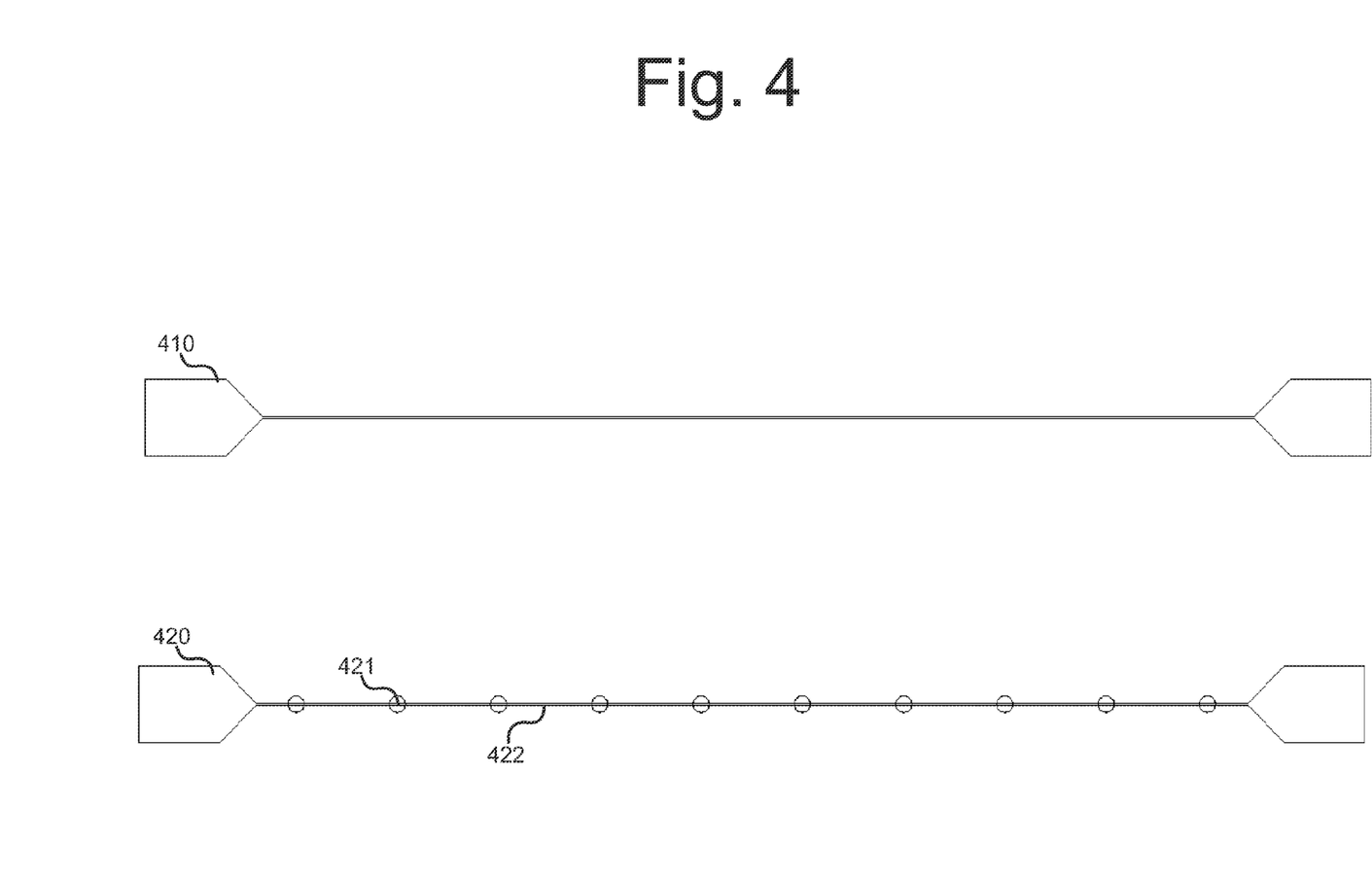
FIG. 4 illustrates an example pair of linear series resistor test structures that may be used to measure the disc length of an NFT.

FIG. 4 illustrates an example pair of linear series resistor test structures 410 and 420 that may be used to measure the disc length of an NFT in an example embodiment of the disclosure. In this embodiment, disc-pin test structure 421 comprises a plurality of discs provided over an elongated pin structure 422. This configuration provides the benefit of increasing the resistance offset with respect to noise in the leads measurement. In one particular implementation of this embodiment, the plurality of discs in the structure are separated by four times or greater the mask disc design diameter. In one mathematical implementation of this embodiment, the disc length may be estimated by Equation (3):

$$Ld = ((Ro - Rd) - knRs)/(nRs/W) \quad (3)$$

Where:
$L_d$ = disc length
$R_o$ = resistance of the disc-less pin structure
$R_d$ = resistance of the pin-disc structure
n is the number of disc elements in the series resistor
$R_s$ = sheet resistance of the NFT film
W = pin width
k = # squares in nominal disc This embodiment may provide the benefit of a larger resistance difference between the two structures, smaller percentage error in the estimate of pin length, and smaller error in the estimate of pin width.

Figure 5A:
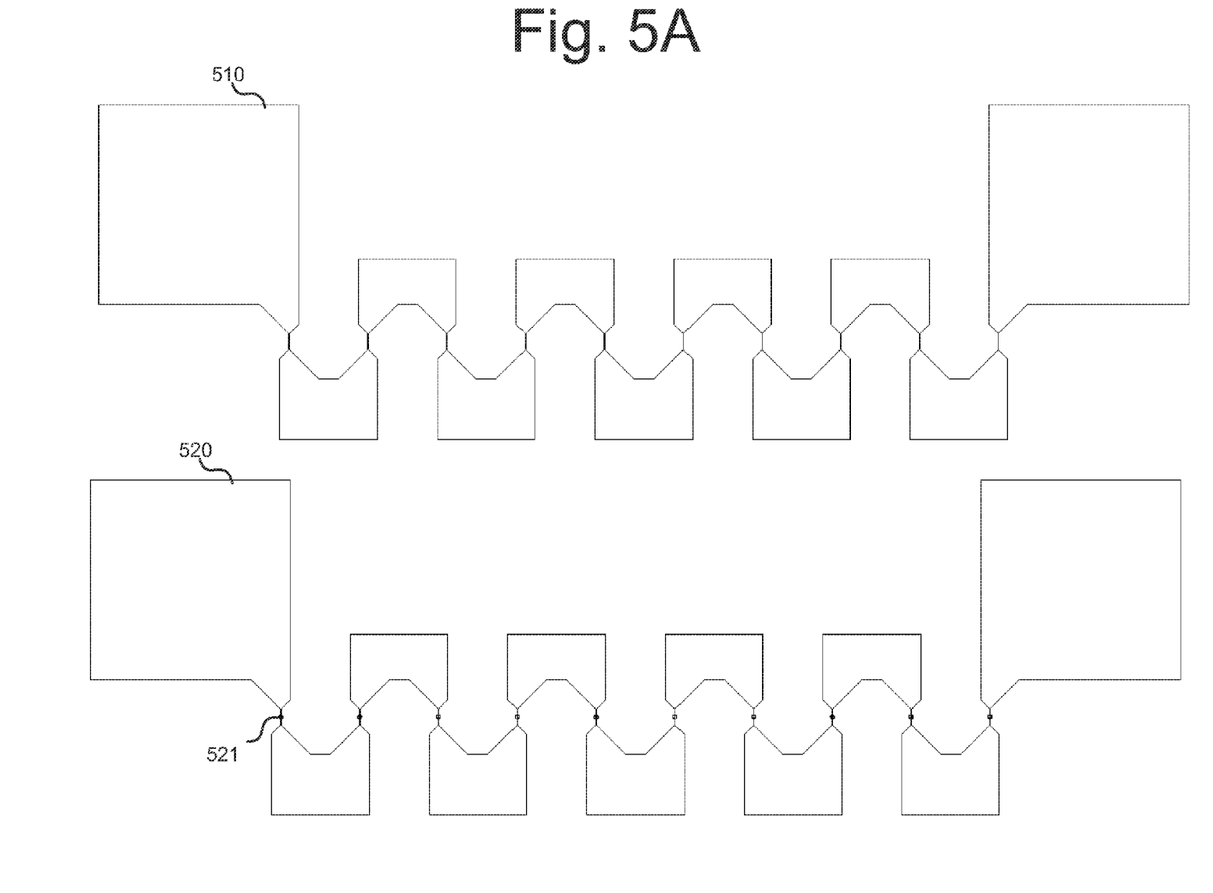
FIGS. 5A-5B illustrate an example pair of serpentine series resistor test structures that may be used to measure the disc length of an NFT.
Figure 5B:
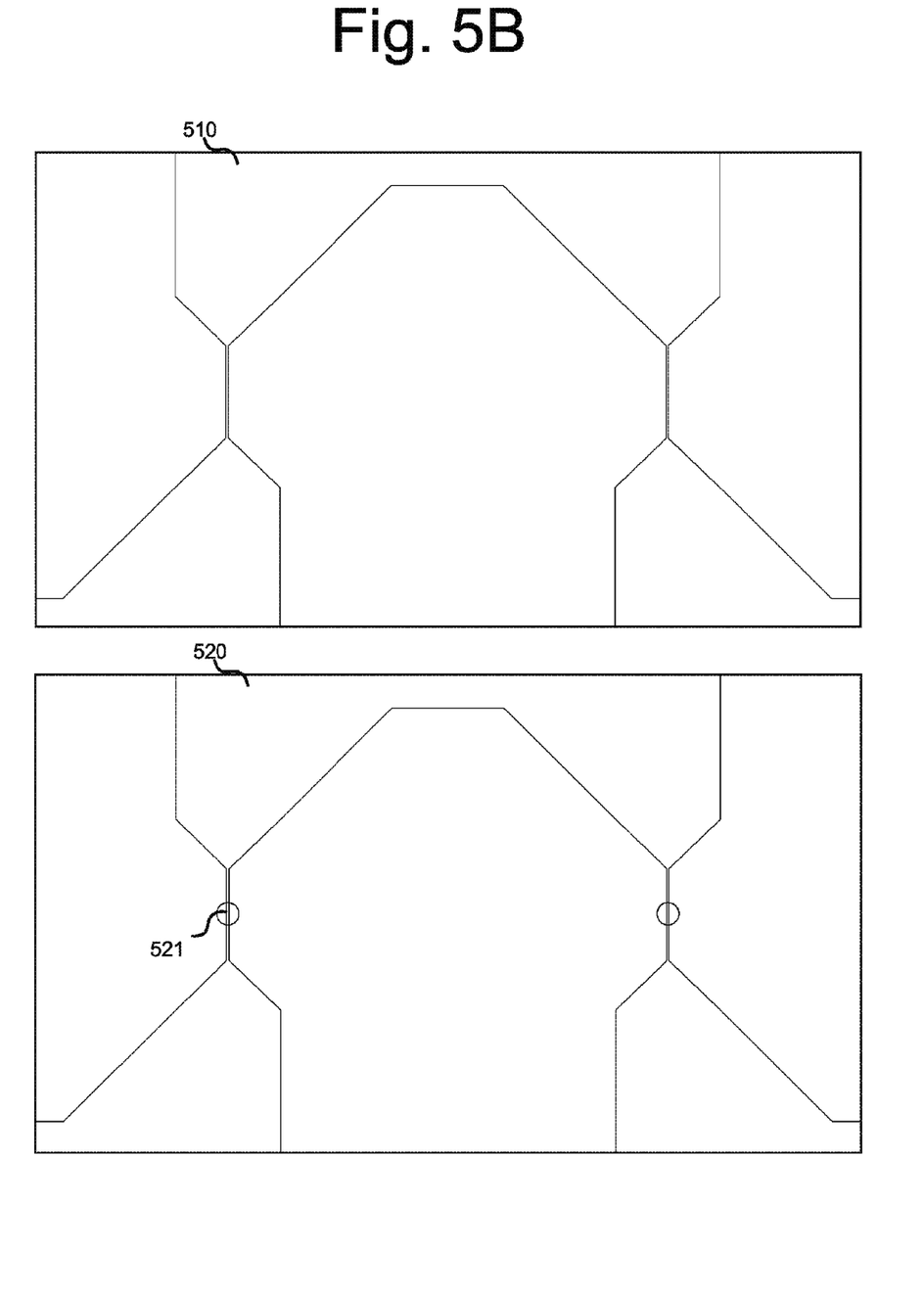

FIGS. 5A-5B illustrate an example pair of serpentine series resistor test structures 510 and 520 that may be used to measure the disc length of an NFT in an example embodiment of the disclosure. Pin-disc test structure 520 comprises a plurality of discs 521. In this embodiment, the interdependence of pin length and disc separation are avoided by arraying the pins and discs to be connected in a serpentine pattern. In particular embodiments of the serpentine series resistor test structures, the pin length may be process limited.

Figure 6:
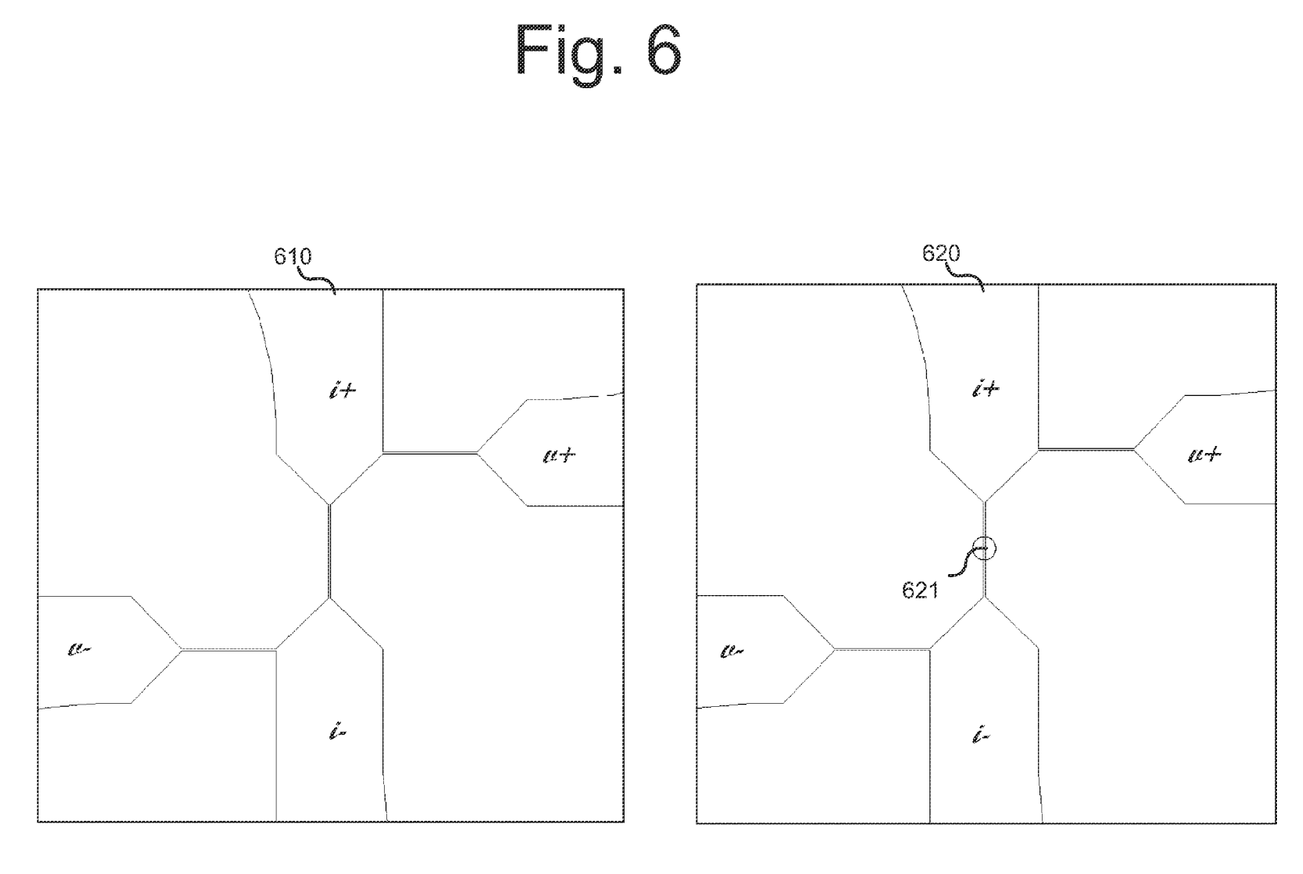
FIG. 6 illustrates an example pair of near four-point test structures that may be used to measure the disc length of an NFT.

FIG. 6 illustrates an example pair of near four-point test structures 610 and 620 that may be used to measure the disc length of an NFT in an example embodiment of the disclosure. Pin-disc test structure 620 comprises disc 621. In this embodiment, the four-point resistor test structure configuration eliminates some or all of the contact resistance and nearly all the leads resistance from the measurements. When a difference in length between two near four-point test structures 610 and 620 is well known, two four-point structures of different length may be used so that the residual leads resistance term may be eliminated in calculating the difference in resistance between the two test structures. In particular embodiments of the near four-point test structures, the pin length may be process limited.

Figure 7:
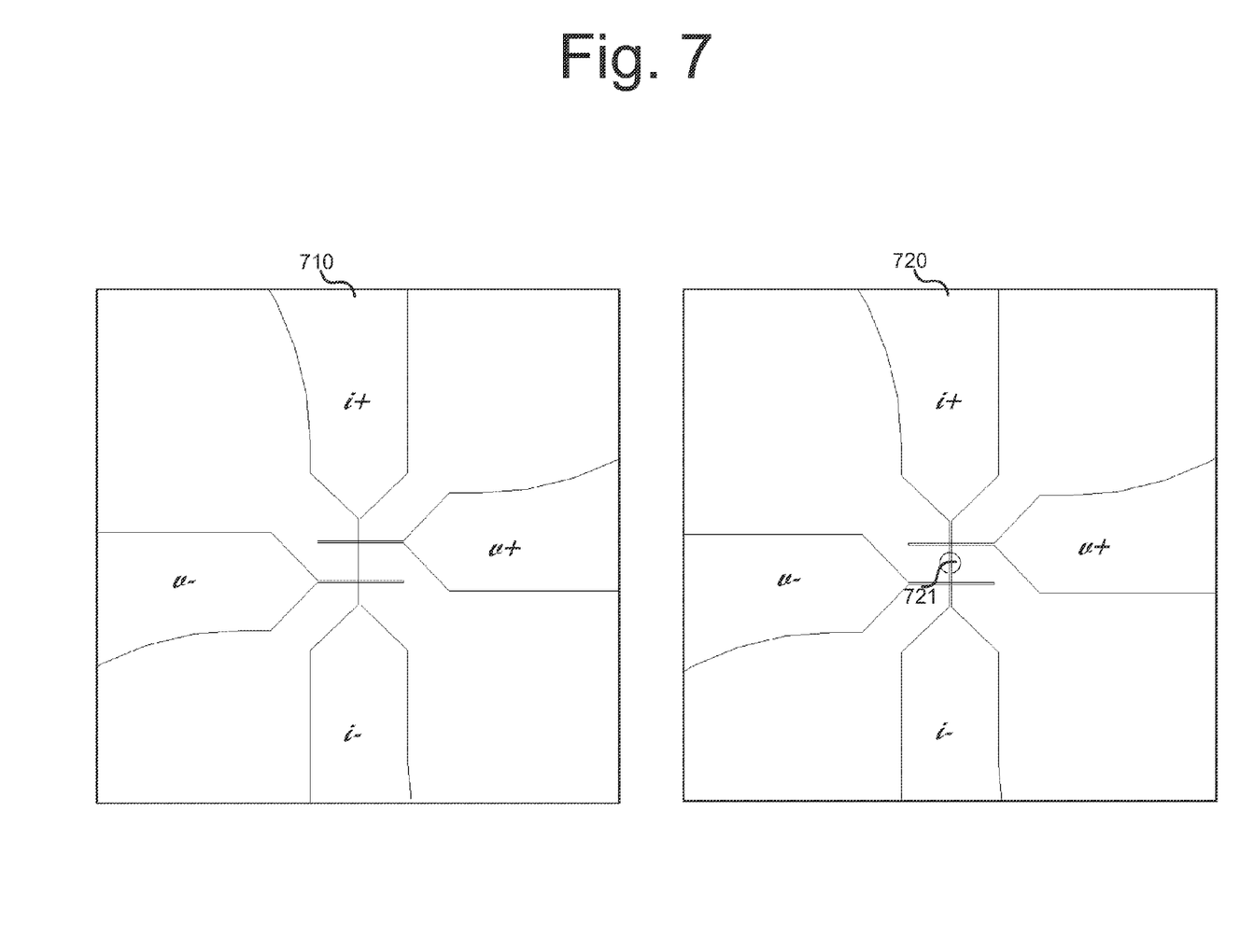
FIG. 7 illustrates an example pair of true four-point test structures that may be used to measure the disc length of an NFT.

FIG. 7 illustrates an example pair of true-four point test structures 710 and 720 that may be used to measure the disc length of an NFT. Pin-disc structure 720 comprises disc 721. The use of true four-point differential test structures 710 and 720 provides the benefit of eliminating contact resistance and lead resistance from the measurements. In particular embodiments of the true four-point test structures, the pin length may be process limited.

In the foregoing specification, embodiments of the disclosure have been described with reference to specific exemplary features thereof. It will, however, be evident that various modifications and changes may be made thereto without departing from the broader spirit and scope of the disclosure. The specification and figures are, accordingly, to be regarded in an illustrative rather than a restrictive sense.

What is claimed is:

1. A system for controlling the disc length of a Near Field Transducer (NFT), comprising:
   a first test structure comprising a disc and a pin; and
   a second test structure comprising a pin;
   wherein the first test structure disc length is determined based on a measured resistance of the first test structure and a measured resistance of the second test structure; and
   wherein the first test structure disc length is approximately the same as the NFT disc length.

2. The system of claim 1, wherein the first test structure, the second test structure, and the NFT are formed on a same wafer.

3. The system of claim 1, wherein the second test structure is approximately the same length and shape as the first test structure.

4. The system of claim 3, wherein the first test structure and the second test structure each comprise two contacts and two leads.

5. The system of claim 4, wherein the resistance of the first test structure depends on the pin length, the pin width, disc diameter, disc length, and total leads resistance.

6. The system of claim 5, wherein the first test structure disc and pin are defined on the same disc film.

7. The system of claim 5, wherein the first test structure disc is defined on a disc film, and wherein the first test structure pin is defined on a pin film.

8. The system of claim 5, wherein the resistance of the first test structure further depends on the sheet resistance of the disc film and the sheet resistance of the pin film.

9. The system of claim 5, wherein the first test structure and the second test structure are single resistor test structures.

10. The system of claim 5, wherein the first test structure and the second test structure are linear series resistor test structures.

11. The system of claim 5, wherein the first test structure and the second test structure are serpentine series resistor test structures.

12. The system of claim 5, wherein the first test structure and the second test structure are near four-point test structures.

13. The system of claim 5, wherein the first test structure and the second test structure are true four-point test structures.

* * * * *